United States Patent [19]

Kodaira et al.

[11] Patent Number: 5,214,083
[45] Date of Patent: May 25, 1993

[54] POLY(PHENYLENE SULFIDE) RESIN COMPOSITIONS

[75] Inventors: Tetsuji Kodaira; Hiromi Ishida; Hidekazu Kabaya, all of Moka, Japan

[73] Assignee: General Electric Company, Pittsfield, Mass.

[21] Appl. No.: 745,583

[22] Filed: Aug. 15, 1991

[51] Int. Cl.$^5$ .............. C08K 5/15; C08K 5/09; C08K 5/3415
[52] U.S. Cl. .................... 524/95; 524/112; 524/114; 524/320; 525/390; 525/391
[58] Field of Search ........... 525/390, 391; 524/95, 524/320, 112, 114

[56] References Cited

U.S. PATENT DOCUMENTS

| | | | |
|---|---|---|---|
| 4,315,086 | 2/1982 | Ueno et al. | 525/391 |
| 4,873,286 | 10/1989 | Gallucci et al. | 525/392 |
| 4,943,399 | 7/1990 | Taubitz et al. | 525/391 |
| 4,997,612 | 3/1991 | Gianchandai et al. | 525/391 |
| 5,026,787 | 6/1991 | Takagi et al. | 525/391 |
| 5,028,656 | 7/1991 | Okabe | 525/391 |
| 5,073,620 | 12/1991 | Sanada et al. | 525/391 |

FOREIGN PATENT DOCUMENTS

| | | |
|---|---|---|
| 53-69255 | 6/1978 | Japan . |
| 56-49753 | 5/1981 | Japan . |
| 59-213758 | 12/1984 | Japan . |
| 62-50056 | 3/1987 | Japan . |

*Primary Examiner*—Veronica P. Hoke

[57] ABSTRACT

Blends of polyphenylene sulfides, polyphenylene ethers and certain polyamides are made more compatible by incorporating in the polymeric blend either citric, malic or agaricic acid or one of their derivatives, trimellitic anhydride acid chloride, oxazolinyl or epoxy-containing ethylenically unsaturated compounds, or oxazolinyl or epoxy-containing polymers.

15 Claims, No Drawings

POLY(PHENYLENE SULFIDE) RESIN COMPOSITIONS

The present invention relates to poly(phenylene sulfide) resin compositions, and in particular, to improved resin compositions which do not show the brittleness typical of poly(phenylene sulfides) (hereinafter abbreviated PPS) when subjected to impact.

PPS resins have excellent heat resistance, flame retardance, chemical resistance, and stiffness, which make them extremely useful as engineering plastics, but they have the drawback of being brittle when subjected to impact. There have therefore been efforts to develop resin compositions which exhibit the desirable properties of poly(phenylene sulfides) while overcoming this drawback.

For example, compositions of poly(phenylene ethers) (hereinafter abbreviated PPE) and poly(phenylene sulfides), in which poly(phenylene sulfides) are added to improve the moldability and flame retardance of the poly(phenylene ethers), are described in Japanese Early Patent Disclosure Publication No. 50-156561.

Poly(phenylene ether) resin compositions containing both poly(phenylene sulfides) and polyamides are described in Japanese Early Patent Disclosure Publication No. 53-69255. These seek to overcome the brittleness of poly(phenylene sulfides).

In addition, blends of poly(phenylene sulfides) and poly(phenylene ethers) to which polyamides and epoxy resins are added in order to improve the compatibility of poly(phenylene sulfides) with poly(phenylene ethers) are described in Japanese Early Patent Disclosure Publication No. 59-213758.

The present invention is one in which poly(phenylene sulfides) are compounded with poly(phenylene ethers) and polyamides in order to overcome their brittleness. But because poly(phenylene sulfides) and poly(phenylene ethers) have inherently poor compatibility when they are simply blended, the resulting resin is brittle, and its appearance is not very good. When polyamide and epoxy resins are added to improve the compatibility of poly(phenylene sulfides) and poly(phenylene ethers), a reaction occurs between the epoxy resins, polyamides, and poly(phenylene sulfides), and this causes a problem in that the melt flow characteristics of the composition are not constant. When poly(phenylene sulfides) and polyamides are compounded, they show poor compatibility, so there is little improvement in the brittleness of poly(phenylene sulfides), and an additional problem of phase separation tends to occur.

The object of the present invention is to blend poly(phenylene sulfides), poly(phenylene ethers), and polyamides without these problems, and thus provide poly(phenylene sulfide) resin compositions with high impact resistance.

SUMMARY OF THE INVENTION

The present inventors have discovered that this object can be accomplished with compositions of poly(phenylene sulfides), poly(phenylene ethers), polyamides, and compatibilizers, provided that certain polyamides are used.

The present invention thus provides poly(phenylene sulfide) resin compositions consisting mainly of
 (a) 40-90 wt % poly(phenylene sulfides),
 (b) 5-55 wt % poly(phenylene ethers),
 (c) 5-55 wt % polyamides, and
 (d) 0.01-10 wt. parts compatibilizers per 100 wt. parts of components (a), (b), and (c),
in which the polyamides are copolymers of nylon 6 and nylon 12, and/or nylon 6/36.

The poly(phenylene sulfides) used in the present invention are preferably polymers comprising at least 70 mole % repeating units represented by the formula

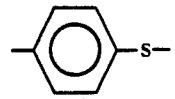

since these polymers give compositions with excellent properties. The poly(phenylene sulfides) may be prepared by polymerization of p-dichlorobenzene in the presence of sulfur and sodium carbonate, by polymerization of p-dichlorobenzene in a polar solvent in the presence of sodium sulfide, sodium hydrosulfide and sodium hydroxide, or hydrogen sulfide and sodium hydroxide, by condensation of p-chlorothiophenol, etc. A suitable method is the reaction of sodium sulfide with p-dichlorobenzene in an amide solvent such as N-methylpyrrolidone or dimethylacetamide, or a sulfone solvent such as sulfolane. Alkali hydroxides are preferably added, and the alkali metal salt of a carboxylic acid or sulfonic acid may be added to control the degree of polymerization. The polymer may also contain up to 30 mole %, preferably not more than 10 mole %, comonomers which form meta or ortho linkages.

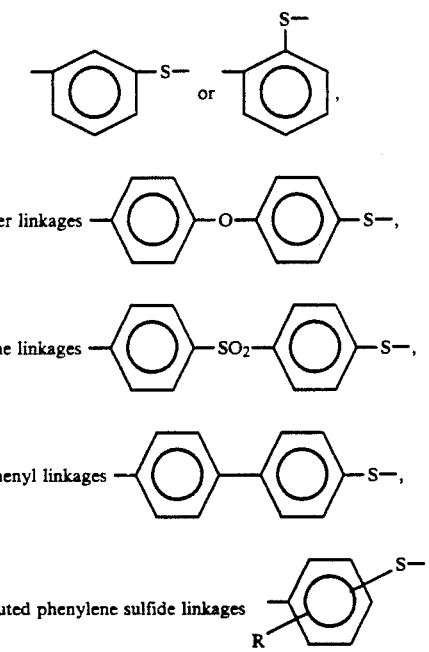

(where R represents an alkyl, nitro, phenyl, alkoxy, carboxy, or metal carboxylate group), or trifunctional phenylene sulfide

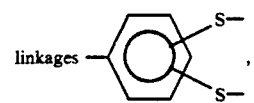

linkages so long as these copolymerized components do not substantially affect the crystallinity of the polymer.

When trifunctional or higher functional phenyl, biphenyl, or naphthyl sulfides are used for copolymerization, the comonomer content should be 3 mole % or less, preferably not more than 1 mole %.

Poly(phenylene sulfides) of this type can be synthesized by any of various methods, for example, (1) the reaction of a halogenated aromatic compound with an alkali sulfide (see U.S. Pat. No. 2,513,188, Japanese Patent Publication No. 44-27671, Japanese Patent Publication No. 45-3368), (2) the condensation reaction of a thiophenol in the presence of an alkali catalyst or a copper salt (see U.S. Pat. No. 3,274,165, U.K. Patent No. 1,160,660), or (3) the condensation reaction of an aromatic compound with sulfur chloride in the presence of a Lewis acid catalyst (see Japanese Patent Publication No. 46-27255, Belgian Patent No. 29437).

Poly(phenylene sulfides) are presently being marketed by Phillips Petroleum, Toso Susteel, Solprene, and Kureha Chemical. There are various grades, with differing crosslink densities and viscosities. For the purposes of the present invention, poly(phenylene sulfides) with little crosslinking in their structure are preferred.

The poly(phenylene ethers) used as component (b) are polymers represented by general formula (A)

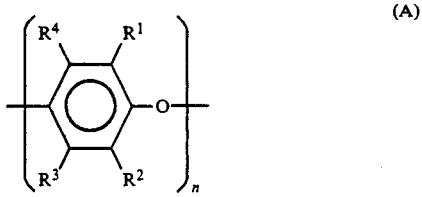

(A)

(where $R^1$, $R^2$, $R^3$, and $R^4$ are hydrogen atoms or monovalent substituents having no tertiary $\alpha$ carbons, selected from halogen atoms, alkyl groups, alkoxy groups, and haloalkyl or haloalkoxy groups having at least two carbon between the halogen atom and the phenyl ring; and n is an integer representing the degree of polymerization). They may be either homopolymers or copolymers combining two or more repeating units of this type. In preferred examples, $R^1$ and $R^2$ are $C_{1-4}$ alkyl groups, while $R^3$ and $R^4$ are hydrogen atoms or $C_{1-4}$ alkyl groups. Examples include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), and poly(2-ethyl-6-propyl-1,4-phenylene ether). PPE copolymers include poly(phenylene ethers) having repeating units like those above along with units derived from trialkyl phenols such as 2,3,6-trimethylphenol. They may also be copolymers formed by grafting styrenic monomers onto poly(phenylene ethers). Among the styrenic monomers which may be used to make styrene-grafted poly(phenylene ethers) are styrene, $\alpha$-methylstyrene, vinyltoluene, and chlorostyrene.

The polyamides used as component (c) are copolymers of nylon 6 and nylon 12, and/or nylon 6/36. In this specification, the term "copolymers of nylon 6 and nylon 12" refers to copolymers formed from $\epsilon$-caprolactam and $\omega$-laurolactam or 12-aminododecanoic acid, which may be block or random copolymers. They preferably contain 0.02-50 moles of nylon 12 units per mole of nylon 6 units.

Resin compositions in accordance with the present invention contain poly(phenylene sulfides), poly(phenylene ethers), and polyamides in the following proportions. There should be 40-90 wt % (preferably 50-80 wt %) poly(phenylene sulfides), 5-55 wt % (preferably 10-40 wt %) poly(phenylene ethers), and 5-55 wt % (preferably 10-40 wt %) polyamides. If a composition has less than 40 wt % poly(phenylene sulfides), it will not show the full stiffness, heat resistance, and flame retardance characteristic of PPS resins. If the poly(phenylene ether) content is less than 5 wt %, the properties of the composition will be significantly affected by moisture absorption by the polyamides, and the heat resistance and stiffness will be lowered. If the polyamide content is below 5 wt %, the appearance of the material will be poor, and the brittleness of poly(phenylene sulfides) will not be sufficiently overcome.

In addition to the components described above, resin compositions in accordance with the present invention also contain compatibilizers (d). Preferred examples of such compatibilizers include (a) citric acid, malic acid, agaricic acid, or derivatives thereof, (b) compounds having both (i) carbon-carbon double or triple bonds, and (ii) carboxylic acid, acid anhydride, amide, imide, carboxylate ester, epoxy, amino, or hydroxy groups, or (c) compounds having carboxylic acid or acid anhydride groups and acid halide groups.

The use of (a) citric acid, malic acid, agaricic acid, or derivatives thereof is described in Japanese Early Patent Disclosure Publication No. 61-502195. Any of the compounds represented by the general formula in that publication may be used in the present invention, although the compounds listed above are particularly preferred. The derivatives may be esters, amides, anhydrides, hydrates, or salts of these acids. Examples of esters include citric acid acetyl ester, and mono- and distearyl citrates. Examples of amides include N,N'-diethyl amides, N,N'-dipropyl amides, n-phenyl amides, N-dodecyl amides, and N,N'-didodecyl amides of citric acid, as well as N-dodecyl amides of malic acid. Examples of salts include calcium malate, calcium citrate, calcium malate, and potassium citrate.

Compatibilizing agents of type (b) are described in Japanese Early Patent Disclosure Publication No. 56-49753. Examples include maleic anhydride, maleic acid, fumaric acid, maleimide, maleic acid hydrazide, reaction products of maleic acid with diamines, such as

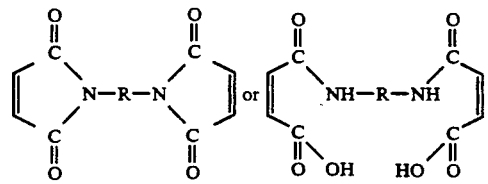

where R represents an aliphatic or aromatic group), methylnadic anhydride, dichloromaleic anhydride, and maleamide, as well as natural oils such as soybean oil, tung oil, castor oil, linseed oil, hempseed oil, cottonseed oil, sesame oil, peanut oil, camellia oil, olive oil, palm oil, other vegetable oils, or sardine oil; epoxidized natural oils such as epoxidized soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadi enoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinolic acid, eleostearic acid, oleic acid, eicosapentaenoic acid, ersinic acid, docosadienoic acid, docosatrienoic acid, docosatetraenoic acid, docosapentaenoic acid, tetracosenoic acid, hexacosenoic acid, hexacosadienoic acid, octacosenoic acid, and tetracosenoic acid; esters, amides, and anhydrides of such unsaturated carboxylic acids; unsaturated alcohols such as allyl alcohol, crotyl alcohol, methyl vinyl carbinol, allyl carbinol, methyl propenyl carbinol, 4-penten-1-ol, 10-undecen-1-ol, propargyl alcohol, 1,4-pentadiene-3-ol, 1,4-hexadiene-3-ol, 3,5-hexadiene-2-ol, 2,4-hexadiene-1-ol, alcohols represented by the general formulas $C_nH_{2n-5}OH$, $C_nH_{2n-7}OH$, or $C_nH_{2n-9}OH$ (where n is a positive integer), 3-butene-1,2-diol, 2,5-dimethyl-3-hexene-2,5-diol, 1,5-hexadiene-3,4-diol, and 2,6-octadiene-4,5-diol; unsaturated amines in which the OH groups of the above unsaturated alcohols are replaced with $NH_2$ groups; adducts of maleic anhydride or phenols with oligomeric polymers (e.g., average molecular weight of about 500 to 10,000) of compounds such as butadiene or isoprene; or similar polymers treated to introduce amino, carboxy, hydroxy, or epoxy groups. Compounds of type (b) may also contain two or more (i) groups and two or more (ii) groups (which may be identical or different).

As a particular example of a compound of type (c), trimellitic anhydride chloride is recited in Japanese Early Patent Disclosure Publication No. 62-500456.

Other examples of compatibilizers (d) include unsaturated monomers and/or polymers having epoxy groups and/or oxazolinyl groups.

Examples of unsaturated monomers having epoxy groups and/or oxazolinyl groups include the following.

Preferred unsaturated monomers having epoxy groups include glycidyl methacrylate (hereinafter abbreviated GMA), glycidyl acrylate, vinyl glycidyl ether, glycidyl ethers of hydroxyalkyl (meth)acrylates, poly(alkylene glycol) (meth)acrylate glycidyl ethers, and glycidyl itaconate.

Preferred unsaturated monomers having oxazolinyl groups are represented by the general formula

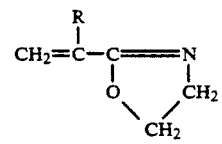

where Z is a group containing a polymerizable double bond.

Preferred substituent groups Z are the following.

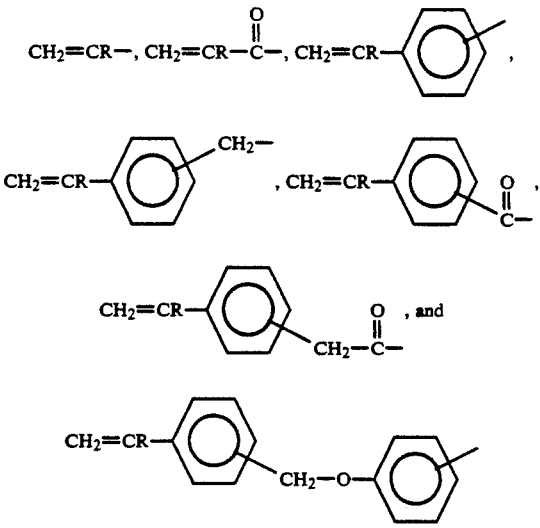

where R is a hydrogen atom or an alkyl or alkoxy group having 1 to 6 carbon atoms, such as a methyl, isopropyl, n-propyl, or butyl group.

Particularly preferred compounds are vinyl oxazolines represented by the general formula

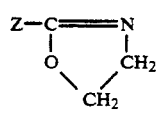

where R is as defined above, preferably a hydrogen atom or a methyl group.

Polymers having epoxy groups or oxazolinyl groups include homopolymers of such unsaturated monomers, copolymers of two or more such unsaturated monomers, and copolymers of such monomers with other unsaturated monomers, such as:

styrene (hereinafter abbreviated St) or other aromatic vinyl monomers;

acrylonitrile or other cyano vinyl monomers;

vinyl acetate, acrylic acid (salts), methacrylic acid (salts), acrylate esters, methacrylate esters, maleic acid (anhydride), maleate esters, 2-norbornene-5,6-dicarboxylic acid (anhydride), or other unsaturated carboxylic acids or derivatives thereof;

ethylene, propylene, 1-butene, 1-pentene, 4-methyl-1-pentene, 1-hexene, 1-octene, 1-decene, 1-tetradecene, 1-hexadecene, 1-octadecene, 1-eicosene, or other α-olefins; or butadiene, isoprene, 1,4-hexadiene, 5-ethylidene-2-norbornene, 5-vinyl-2-norbornene, or other dienes.

Examples of copolymers thus include GMA/St, GMA/St/MMA (methyl methacrylate)/MA, GMA/St/acrylonitrile, GMA/MMA/acrylonitrile, GMA/MMA, GMA/MMA/St, vinyloxazoline/St, vinyloxazoline/MMA, ethylene/GMA, and ethylene/vinyl acetate/GMA. (Of course copolymers other than these may also be used in accordance with the present invention.)

The amount of compatibilizer used as component (d) is generally in the range of 0.01 to 10 wt. parts (preferably 0.1 to 3 wt. parts) per 100 wt. parts of (a) poly(phenylene sulfides), (b) poly(phenylene ethers), and (c)

polyamides. If less than this amount is used, the intended effect will not be obtained, while if more than this is used, the heat resistance of products fabricated from the composition will be greatly reduced.

For better impact strength, compositions in accordance with the present invention may also be blended with up to 20 wt. parts rubbers per 100 wt. parts of poly(phenylene sulfides), poly(phenylene ethers), and polyamides.

The rubbers may be natural or synthetic polymers which are elastomeric at room temperature. Examples include natural rubber, butadiene polymers, butadiene-styrene copolymers (including random copolymers, block copolymers, and graft copolymers), isoprene polymers, chlorobutadiene polymers, butadiene-acrylonitrile copolymers, isobutylene polymers, isobutylene-butadiene copolymers, isobutylene-isoprene copolymers, acrylate ester copolymers, ethylene-propylene copolymers, ethylene-propylene-diene copolymers, Thiokol rubbers, polysulfide rubbers, polyurethane rubbers, polyether rubbers [e.g., poly(propylene oxide)], and epichlorohydrin rubbers.

Resin compositions in accordance with the present invention may also contain other resins or additives introduced during compounding or fabrication in amounts which do not impair the desired properties of the composition. Such additives may include pigments, dyes, reinforcing agents (glass fibers, carbon fibers, etc.), fillers (carbon black, silica, titanium dioxide, etc.), heat stabilizers, antioxidants, light stabilizers, lubricants, release agents, crystal nucleating agents, plasticizers, flame retardants, flow enhancers, and/or antistatic agents. Some of these materials are described in more detail below.

Compositions in accordance with the present invention are preferably prepared by melt kneading techniques. Small amounts of solvents may be used, although they are generally not necessary. The equipment used may be a Banbury mixer, mixing rolls, or a kneader, operating batchwise or continuously. There is no particular limitation on the order in which the components are mixed. The poly(phenylene sulfide), poly(phenylene ether), polyamide, and compatibilizer premixed with the compatibilizer, then with the polyamide, and finally with the poly(phenylene sulfide); or the poly(phenylene ether), polyamide, and compatibilizer may be premixed, then combined with the poly(phenylene sulfide).

EXAMPLES

Set No. 1

The present invention will now be described more concretely by means of some examples. In these examples, all parts are parts by weight.

The poly(phenylene sulfide) used was Tohprene T4 (trade mark of Tohprene Ltd.).

The poly(phenylene ether) used was NORYL® (trade name of Nippon GE Plastics).

The following polyamides were used.

PA-A: copolymer of nylon 6 and nylon 12 (monomer mole ratio 80:20, trade name 7024B, from Ube Industries, $[NH_2]=5.3\times10^{-5}$ eq/g, $[COOH]=5.6\times10^{-5}$ eq/g)

PA-B: copolymer of nylon 6 and nylon 12 (monomer mole ratio 60:40, trade name 7028B, from Ube Industries, $[NH_2]=2.8\times10^{-5}$ eq/g, $[COOH]=5.9\times10^{-5}$ eq/g)

PA-C: Nylon 6/36 (trade named Priadit 2054, from Unichema Co.)

PA-D: Nylon 6 (from Ube Industries, $[NH_2]=8.4\times10^{-5}$ eq/g, $[COOH]=1.8\times10^{-5}$ eq/g, molecular weight 13,000)

The compatibilizers used were RPS 1005 (trade name for a styrene copolymer with 5% oxazoline derivative monomer, from Nippon Shokubai Kagaku Ltd.), and citric acid.

In addition, Kraton G 1651 [trade name for partially hydrogenated styrene-butadiene block copolymer (SEBS) from Shell Chemical] was used as an optional rubber component.

EXAMPLES 1-3,

Comparisons 1-2

The amounts (wt. parts) of the poly(phenylene ether), citric acid, and Kraton G 1651 listed in the table were kneaded in a twin-screw extruder (screw diameter 50 mm) set at 320° C., and pelletized. The pellets were mixed with one of the polyamides, kneaded in the same extruder set at 280° C., and pelletized. The resulting pellets were in turn mixed with the poly(phenylene sulfide), kneaded in the same extruder set at 320° C., and pelletized. Those pellets were dried, then injection molded at 320° C. into 50×50×3-mm specimens, which were tested for impact resistance. The test was performed at room temperature, using a rapid-load impact tester (from Shimazu Seisakusho Ltd.), with a striker diameter of 12.7 mm, a striker velocity of 5 m/sec, and a hole diameter of 25.4 mm. The results are listed in the Table.

Comparison 2

The amounts (wt. parts) listed in the table of the poly(phenylene ether) and Kraton G 1651 were kneaded in a twin-screw extuder (screw diameter 50 mm) set at 320° C., pelletized, mixed with the poly(phenylene sulfide) and RPS 1005, kneaded in the twin-screw extruder at 320° C., and pelletized. The resulting pellets were injection molded as in Examples 1-3, and tested for impact resistance under the same conditions as in Examples 1-3. The results are also listed in the table.

|  | Example | | | Comparison | |
| --- | --- | --- | --- | --- | --- |
|  | 1 | 2 | 3 | 1 | 2 |
| (a) Poly(phenylene sulfide) | 50 | 50 | 50 | 50 | 50 |
| (b) Poly(phenylene ether) | 15 | 15 | 15 | 15 | 25 |
| (c) Polyamide |  |  |  |  |  |
| PA-A | 20 |  |  |  |  |
| PA-B |  | 20 |  |  |  |
| PA-C |  |  | 20 |  |  |
| PA-D |  |  |  | 20 |  |
| (d) Compatibilizer |  |  |  |  |  |
| RPS 1005 |  |  |  |  | 10 |
| Citric Acid | 0.35 | 0.35 | 0.35 | 0.35 |  |
| Optional Components |  |  |  |  |  |
| Kraton G 1651 | 15 | 15 | 15 | 15 | 15 |
| Impact Resistance Test |  |  |  |  |  |
| Fracture Energy (kg-cm) | 430 | 400 | 390 | 280 | 80 |

Results of Invention

The present invention has made it possible to improve the impact resistance of resin compositions containing poly(phenylene sulfides), poly(phenylene ethers), and polyamides.

As mentioned above, resin compositions in accordance with the present invention also may contain inorganic fillers as component (e). Examples of the inorganic fillers which may be used include glass beads, asbestos, glass fibers, glass flakes, milled glass, wollastonite, mica, talc, potassium titanate, clay, calcium carbonate, and silica. Glass fibers are preferred. The effect of the present invention may be further enhanced by treating these inorganic fillers with agents such as silanes (including amino silanes and epoxy silanes), titanates, or fatty acid compounds. This is usually done by pretreating the inorganic fillers with these agents, but it is also possible to add the inorganic fillers and the treating agents to the composition separately. When glass fibers are used as the inorganic fillers, it is preferable to use sizing agents having functional groups such as amino, epoxy, hydroxy, acid anhydride, carboxy, amide, imide, carboxylate ester, isocyanate, and/or oxazolinyl groups. Such pretreating agents and sizing agents may be used together.

The amount of inorganic fillers in the resin composition should be 5 to 150 wt. parts (preferably 10–100 wt. parts) per 100 wt. parts of components (a), (b), and (c).

In addition to the components described above, resin compositions in accordance with the present invention may optionally contain flame retardants. These flame retardants may be halogen compounds or phosphorus compounds.

Examples of halogen-containing flame retardants include brominated polystyrene, brominated poly(phenylene ethers), brominated polycarbonates, brominated epoxy resins, and brominated imides.

Example of phosphate ester flame retardants include trimethyl phosphate, triethyl phosphate, tributyl phosphate, trioctyl phosphate, tributoxyethyl phosphate, triphenyl phosphate, tricresyl phosphate, cresyl phenyl phosphate, octyl diphenyl phosphate, diisopropyl phenyl phosphate, tris(chloroethyl) phosphate, tris(dichloropropyl) phosphate, tris(chloropropyl) phosphate, bis(2,3-dibromopropyl) 2,3-dichloropropyl phosphate, tris(2,3-dibromopropyl) phosphate, and bis(chloropropyl) monooctyl phosphate, as well as mixed esters such as bisphenol A bisphosphates, hydroquinone bisphosphates, resorcinol bisphosphates, and trihydroxybenzene trisphosphates containing methoxy, ethoxy, propoxy, or other alkoxy groups, or preferably phenoxy, methylphenoxy, substituted phenoxy, or substituted methylphenoxy groups. Preferred examples include triphenyl phosphate and the various bisphosphates.

The amount of such phosphate ester compounds added is preferably 0.01–40 wt. parts, most preferably 0.5–20 wt. parts, per 100 parts poly(phenylene sulfides).

For better impact strength, compositions in accordance with the present invention may also be blended with up to 80 wt. parts rubbers per 100 wt. parts of poly(phenylene sulfides), poly(phenylene ethers), and polyamides.

The rubbers may be natural or synthetic polymers which are elastomeric at room temperature. Examples include natural rubber, butadiene polymers, styrene-isoprene copolymers, butadiene-styrene copolymers (including random copolymers, block copolymers, and graft copolymers), isoprene polymers, chlorobutadiene polymers, butadiene-acrylonitrile copolymers, isobutylene polymers, isobutylene-butadiene copolymers, isobutylene-isoprene copolymers, acrylate ester copolymers, ethylene-propylene copolymers, ethylene-propylenediene copolymers, Thiokol rubbers, polysulfide rubbers, polyurethane rubbers, polyether rubbers [e.g., poly(propylene oxide)], and epichlorohydrin rubbers.

Compositions in accordance with the present invention are preferably prepared by melt kneading techniques. Small amounts of solvents may be used, although they are generally not necessary. The equipment used may be a Banbury mixer, mixing rolls, or a kneader, operating batchwise or continuously. There is no particular limitation on the order in which the components are mixed. The poly(phenylene sulfide), poly(phenylene ether), polyamide, compatibilizer, and inorganic filler may be mixed all at once; the poly(phenylene ether) may be premixed with the compatibilizer, then with the polyamide, and finally with the poly(phenylene sulfide) and inorganic filler; or the poly(phenylene ether), polyamide, and compatibilizer may be premixed, then combined with the poly(phenylene sulfide) and inorganic filler.

EXAMPLES

Set No. 2

The present invention will now be described more concretely by means of some examples. In these examples, all parts are parts by weight.

The poly(phenylene sulfide) used was Tohprene T4 (trade mark of Tohprene Ltd.).

The poly(phenylene ether) used was NORYL® resin (trade name of Nippon GE Plastics).

The following polyamides were used.

PA-A: copolymer of nylon 6 and nylon 12 (monomer mole ratio 80:20, trade name 7024B, from Ube Industries, $[NH_2] = 5.3 \times 10^{-5}$ eq/g, $[COOH] = 5.6 \times 10^{-5}$ eq/g)

PA-B: copolymer of nylon 6 and nylon 12 (monomer mole ratio 60:40, trade name 7028B, from Ube Industries, $[NH_2] = 2.8 \times 10^{-5}$ eq/g, $[COOH] = 5.9 \times 10^{-5}$ eq/g)

PA-C: Nylon 6/36 (trade named Priadit 2054, from Unichema Co.)

PA-D: Nylon 6 (from Ube Industries, $[NH_2] = 8.4 \times 10^{-5}$ eq/g, $[COOH] = 1.8 \times 10^{-5}$ eq/g, molecular weight 13,000)

PA-E: Grilamid TR 55 (from Mitsubishi Chemical Industries, a polyamide made up of the following monomers)

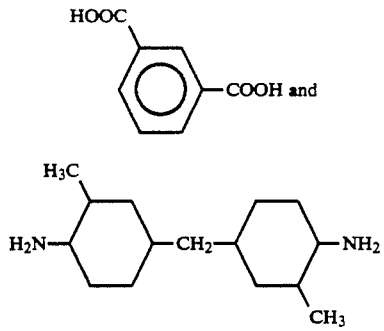

The compatibilizers used were RPS 1005 (trade name for a styrene copolymer with 5 wt % oxazoline derivative monomer, from Nippon Shokubai Kagaku Ltd.), and citric acid.

Glass fibers where used as the inorganic filler.

Triphenyl phosphate was used as the flame retardant.

Specimens were evaluated by means of the following test methods.

pelletized. The resulting pellets were dried, injection molded at 320° C. to form test pieces, and tested. The results are listed in the table.

|  | Ex. 1 | Ex. 2 | Ex. 3 | Co. 1 | Co. 2 | Ex. 4 | Co. 3 | Co. 4 |
|---|---|---|---|---|---|---|---|---|
| Composition (wt. parts) | | | | | | | | |
| (a) Poly(phenylene sulfide) | 70 | 70 | 70 | 70 | 70 | 68 | 68 | 70 |
| (b) Poly(phenylene ether) | 18 | 18 | 18 | 18 | 18 | 15 | 15 | 20 |
| (c) PA-A | 12 | | | | | 10 | | |
| PA-B | | 12 | | | | | | |
| PA-C | | | 12 | | | | | |
| PA-D | | | | 12 | | | 10 | |
| PA-E | | | | | 12 | | | |
| (d) Citric Acid | 0.2 | 0.2 | 0.2 | 0.2 | 0.2 | 0.2 | 0.2 | |
| RPS 1005 | | | | | | | | 10 |
| (e) Glass Fibers | 60 | 60 | 60 | 60 | 60 | 60 | 60 | 60 |
| Triphenyl Phosphate | | | | | | 7 | 7 | |
| Test Results | | | | | | | | |
| Izod Impact Strength (kg-cm/cm) | 6.1 | 5.8 | 5.5 | 5.7 | 6.1 | 6.5 | 6.8 | 7.5 |
| Trichloroethane Resistance | NC* | NC | NC | NC | NC | NC | NC | clouding |
| Heat Resistance | NC | NC | NC | blisters | blisters | NC | blisters | NC |
| Flame Retardance | V-1 | V-1 | V-1 | V-1 | V-1 | V-0 | V-0 | V-1 |

*NC: no change

Izod Impact Test

The notched Izod impact strength was measured by the ASTM D 256 standard method, using $\frac{1}{8} \times \frac{1}{2} \times 2.5$-inch test pieces.

Trichloroethane Resistance

Each resin composition was injection molded to form an ADC connector, which was placed in a container of boiling trichloroethane (boiling point 74° C.) at 80° C. After exposure to trichloroethane vapor for 1 minute, the surfaces of the molding were examined visually.

Heat Resistance

Test pieces measuring 0.8 mm×12.7 mm×50 mm were conditioned at 23° C. and 50% humidity for 24 hours, then placed in Fluorinert FC 71 (from Sumitomo 3M, boiling point 255° C.) vapor for 1 minute, and their surfaces examined for blistering or other deformation.

Fire Resistance (Flame Retardance)

Test pieces measuring 0.8 mm×12.7 mm×127 mm were tested for flame retardance by the UL 94 standard method. In the test results, the lower the V value, the better the flame retardance of the material.

EXAMPLES 1-4

Comparisons 1-3

The amounts (wt. parts) of the poly(phenylene ether) and citric acid listed in the table were kneaded in a twin-screw extruder (screw diameter 50 mm) set at 320° C., and pelletized. The pellets were mixed with one of the polyamides, kneaded in the same extruder set at 280° C., and pelletized. The resulting pellets were in turn mixed with the poly(phenylene sulfide) and glass fibers (and with triphenyl phosphate in Example 4 and Comparison 3), kneaded in the same extruder set at 320° C., and pelletized. Those pellets were dried, then injection molded at 320° C. into test pieces, and subjected to the various tests. The results are listed in the table.

Comparison 4

The amounts (wt. parts) listed in the table of the poly(phenylene sulfide), poly(phenylene ether), glass fibers, and RPS 1005 were kneaded in a twin-screw extruder (screw diameter 50 mm) set at 320° C., and The present invention has made it possible to provide poly(phenylene sulfide) resin compositions with improved impact resistance, heat resistance, and appearance, which do not become deformed at high temperatures or show surface clouding when cleaned with chlorinated solvents.

We claim:
1. A composition comprising:
 (a) 40-90 wt % poly(phenylene sulfide) resin;
 (b) 5-55 wt % poly(phenylene ether) resin;
 (c) 5-55 wt % polyamide resin selected from the group consisting of (I) copolymers of Nylon 6 and Nylon 12, (II) copolymers of Nylon 6, Nylon 12, and Nylon 6/36, and (III) copolymers of Nylon 6 and Nylon 6/36; and
 (d) 0.01-10 wt % of a compatibilizer selected from the group consisting of (I) citric acid, malic acid, agaricic acid and any ester-, amide-, anhydride-, hydrate-, or salt-derivatives of these acids, (II) compounds having both (i) carbon-carbon double or triple bonds and (ii) carboxylic acid, acid anhydride, amide, imide, carboxylate ester, epoxy, amino, or hydroxy groups, and (III) compounds having carboxylic acid or acid anhydride groups and acid halide groups.

2. The composition of claim 1, wherein compatibilizing agent (d) is selected from the group consisting of (i) unsaturated monomers having epoxy groups; (ii) unsaturated monomers having oxazolinyl groups; (iii) unsaturated polymers having epoxy groups; and (iv) unsaturated polymers having oxazolinyl groups.

3. The composition of claim 1, wherein the poly(phenylene sulfide) resin of component (a) comprises a polymer containing at least 70 mole % of repeating units represented by the formula

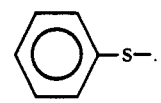

4. The composition of claim 3, wherein the poly(phenylene sulfide) resin contains up to 30 mole % of at least one comonomer which forms meta or ortho linkages, ether linkages, sulfone linkages, biphenyl linkages, substituted phenylene sulfide linkages, or trifunctional phenylene sulfide linkages.

5. The composition of claim 1, wherein the poly(phenylene ether) resin of component (b) is selected from the group consisting of poly(2,6-dimethyl-1,4-phenylene ether);
poly(2,6-diethyl-1,4-phenylene ether);
poly(2-methyl-6-ethyl-1,4-phenylene ether);
poly(2-methyl-6-propyl-1,4-phenylene ether);
poly(2,6-dipropyl-1,4-phenylene ether); poly(2-ethyl-6-propyl-1,4phenylene ether);
and polyphenylene ether copolymers containing units derived from two different alkyl phenols.

6. The composition of claim 1, wherein the polyamide resin of component (c) contains 0.02–50 moles of nylon 12 units per mole of nylon 6 units.

7. The composition of claim 1, wherein the amount of compatibilizer used as component (d) is 0.1 to 3 wt % per 100 parts by weight of components (a), (b), and (c).

8. The composition of claim 1, further including up to 20 wt % rubber per 100 parts by weight of components (a), (b) and (c).

9. The composition of claim 8, wherein the rubber is selected from the group consisting of natural rubber, butadiene polymers, butadiene-styrene copolymers, isoprene polymers, butadiene-acrylonitrile copolymers, isobutylene polymers, isobutylene-butadiene copolymers, acrylate ester copolymers, ethylene-propylene copolymers, ethylene-propylene-diene copolymers, polysulfide rubbers, polyurethane rubbers, polyether rubbers, and epichlorohydrin rubbers.

10. The composition of claim 1, further including effective amounts of at least one additive selected from the group consisting of pigments, dyes, reinforcing agents, fillers, heat stabilizers, antioxidants, light stabilizers, lubricants, release agents, crystal nucleating agents, plasticizers, flame retardants, flow enhancers, and antistatic agents.

11. A thermoplastic composition which, when molded, exhibits a combination of improved impact resistance, heat resistance, flame retardance, surface appearance and solvent resistance, said composition consisting essentially of:
    (a) 40–90 wt % poly(phenylene sulfide) resin;
    (b) 5–55 wt % of a poly(phenylene ether) resin selected from the group consisting of poly(2,6-dimethyl-1,4-phenylene ether); poly(2,3,6-trimethyl-1,4-phenylene ether), and copolymers derived from a mixture of 2,6-dimethylphenol and 2,3,6-trimethylphenol;
    (c) 5–55 wt % of a polyamide resin selected from the group consisting of
        (I) copolymers of Nylon 6 and Nylon 12;
        (II) copolymers of Nylon 6, Nylon 12, and Nylon 6/36; and
        (III) copolymers of Nylon 6 and Nylon 6/36; and
    (d) 0.01–10 wt % of a compatibilizer selected from the group consisting of
        (I) citric acid, malic acid, agaricic acid and any ester-, amide-, anhydride-, hydrate-, or salt-derivatives of these acids; and
        (II) (i) unsaturated monomers having epoxy groups; (ii) unsaturated monomers having oxazolinyl groups; (iii) unsaturated polymers having epoxy groups; or (iv) unsaturated polymers having oxazolinyl groups.

12. The composition of claim 11, further including at least one component selected from the group consisting of (i) 10–100 wt % glass fibers per 100 parts by weight of components (a), (b), and (c); (ii) 0.01–40 wt % of at least one phosphate-based flame retardant agent selected from the group consisting of triphenyl- phosphate, trimethyl phosphate, triethyl phosphate, tributyl phosphate, trioctyl phosphate, tributoxyethyl phosphate, bisphenol A bisphosphates, hydroquinone bisphosphates, resorcinol bisphosphates, and mixtures of any of the foregoing.

13. A thermoplastic composition which, when molded, exhibits a combination of improved impact resistance, heat resistance, flame retardance, surface appearance and solvent resistance, said composition comprising:
    (a) 40–90 wt % poly(phenylene sulfide) resin;
    (b) 5–50 wt % of a poly(phenylene ether) resin selected from the group consisting of poly(2,6-dimethyl-1,4-phenylene ether); poly(2,3,6-trimethyl-1,4-phenylene ether), and copolymers derived from a mixture of 2,6-dimethylphenol and 2,3,6-trimethylphenol;
    (c) 5–55 wt % of a polyamide resin selected from the group consisting of
        (I) copolymers of Nylon 6 and Nylon 12;
        (II) copolymers of Nylon 6, Nylon 12, and Nylon 6/36; and
        (III) copolymers of Nylon 6 and Nylon 6/36; and
    (d) 0.01–10 wt % of a compatibilizer selected from the group consisting of
        (I) citric acid, malic acid, agaricic acid and any ester-, amide-, anhydride-, hydrate-, or salt-derivatives of these acids; and trimellitic anhydride acid chloride;
        (II) unsaturated monomers which contain olefinic derived oxazolinyl groups; and
        (III) polymers which contain oxazolinyl groups.

14. The composition of claim 13, wherein the compatibilizer is selected from the group consisting of vinyl oxazolines; homopolymers of unsaturated monomers which contain oxazoline compounds; and copolymers of unsaturated monomers which contain oxazoline compounds.

15. The composition of claim 13, wherein the compatibilizer comprises a styrene-based homopolymer or copolymer which contains the oxazoline groups.

* * * * *